3,119,697
AGAR PREPARATION AND PROCESS OF
PRODUCING THE SAME
Albert J. Leo, La Grange, and Harold W. McGhee, Naperville, Ill., assignors to National Pectin Products Company, Chicago, Ill., a corporation of Illinois
No Drawing. Filed Jan. 9, 1962, Ser. No. 165,222
7 Claims. (Cl. 99—131)

The present invention relates to agar preparations and processes of producing the same.

The uses of agar are varied and numerous. It has been used as a food adjunct for centuries, a role which it continues to enjoy. Its properties render it useful as a gelling agent, an emulsifying agent, as a thickening assistant, in sizing materials, in dyeing processes, in printing, in adhesive compositions, and in nutrient media for bacterial cultures.

The basic material that is known as agar is derived from various genera and species of red-purple seaweeds of the class Rhodophyceae. The term "agar" as used in the present application comprehends all materials commonly so known in the art, including extracts from certain of the Gracilaria species termed by some biologists as "agaroids" which have for a 1.5 percent solution, a minimum gelation temperature of 85° F., and a minimum gel melting temperature of 180° F. As commercially available, agar usually is furnished in the form of a dry powder.

An important characteristic of agar is its capacity to form gels in water solution. The function of agar in forming gels is a complex phenomenon dependent upon a number of factors, some of which remain quite obscure. In order to maximize the gelling capacity of agar, it is standard practice after mixing the agar with a suitable amount of water to heat the mixture to boiling temperature and then continue the boiling for a short time, generally three minutes, although to obtain the optimum gelling effect, the duration of the period of boiling may be varied to take account of conditions such as the particulate size of the dry material. In order to promote solution of the agar, the practice of subjecting it to a preliminary dry grinding has been resorted to. And if the agar is finely ground, as for example to pass a 150 mesh screen, the boiling period to obtain the maximum gelation effect may be thereby shortened and the temperature of incorporation may be lowered. However, by this process the disadvantage must be accepted that the finer mesh material has a weaker maximum gelling efficiency. This probably is due to some degradation of the material during grinding. Moreover, the maximum efficiency of cold-water solubilization achieved by dry grinding as will be further explained below, is on the order of 5 percent or less.

The term "cold-water solubility" as used in the art to which this invention pertains, signifies solubility at those temperatures at which tap water normally is available in most homes or plants, which thus will be at least 120° F. The terms "soluble," "solution," and "dissolve," as used in this art, refer to the property of agar of dispersing in water in the colloidal form.

By "gelling efficiency," as used herein, reference is had to the ratio of weights of untreated to treated agar necessary to produce gels of equal breaking strength when the untreated agar is brought into solution with a three-minute boil and the treated agar is dissolved at 120° F. This weight ratio is usually multiplied by 100 and expressed as a per centum of the gel strength by the standard boil method of solution.

Of the available methods for measuring gelling efficiency, we have found the following to be suitable in connection with the purposes of the present invention. A given amount of agar to be tested is admixed with water in a 200 ml. high-form beaker at the required temperature, and agitated by means of a Brookfield counter-rotating stirrer for one minute at 120° F., or three minutes at 212° F. This solution is then permitted to cool and set for about eighteen to twenty hours, this period being measured from the time the solution during cooling reaches 100° F. When the solution reaches 40° F. the temperature is maintained at that point for the remainder of the period. The gel strength of the product is then measured by means of a Cherry-Burrell Curd Tension Meter, Model A, and both the initial breaking strength and the resistance to cutting are recorded in grams.

It has been known that if sugar is added to a water solution of a colloidal material such as agar, and the mixture thereafter dried, there will be obtained a preparation which will dissolve in water at a temperature considerably lower than that which would have been requisite for the original pure colloidal material. The efficacy of these prior methods of lowering the temperature of dissolution is dependent upon the presence in the solution of a large amount of water the proportion thereof to agar being in the vicinity of 30 to 1. The drying of the thus diluted mixture accordingly is a time consuming operation and can be effected only by the expenditure of a large amount of heat. Not only are such methods costly but the cold-water gel efficiency of the product is unsatisfactory, rarely being as much as 50 percent. That is, although the agar thus processed will dissolve more readily in cold water—for example, at 120° F.—in comparison, with the original agar, it is necessary in order to produce a gel of a strength equal to that obtained by dissolving the untreated material in boiling water, to use about twice as much of the agar material.

It is a basic object of the present invention to render agar cold-water soluble.

It is a further object of the present invention to provide a method of rendering agar cold-water soluble that will yield a product of high gel efficiency.

It is a further object of the present invention to prepare a modified agar product that will be in the form of a fine free-flowing powder, devoid of objectionable tastes.

Further objects include the provision of a modified agar preparation, useful as an icing stabilizer, and in other foods and related compositions.

An important object of the invention is the reduction of the amount of water necessary in preparing a cold-water soluble agar preparation whereby the size of the necessary equipment can be kept to a minimum and the final material can be dried in the form of a wet solid.

In accordance with our invention we have found that if agar, in its commercially available form, is admixed with a relatively small proportion of water, wherein the agar constitutes approximately 5 to 12% of the mixture, in the presence of a crystallization controller of the type hereinafter described, the amount of the crystallization controller being substantially one-half to ten times or more the weight of the agar, preferably not less than an equal weight, and these materials thoroughly incorporated by agitation at elevated temperature, preferably at the boiling temperature of the water, and the mixture thereafter is allowed to solidify whence it is finely chopped and dried rapidly to a moisture content of substantially 4% or less, the product obtained constitutes a cold-water soluble agar preparation having a surprisingly high gel strength, nearly as great when redissolved in water at 120° F. for example, as the original untreated agar when it is dissolved by boiling for three minutes. In sharp contrast to cold-water soluble agar that has been previously prepared by somewhat similar processing but in the absence of said crystallization controllers, the gelling efficiency of the modified product according to the present invention when dissolved in water at 120° F. is found to be as high as 90% or better.

By the term "crystallization controller" as used in the present disclosure, reference is had to a soluble but difficult to crystallize substance selected from the group consisting of dextrose, fructose, invert sugar, maltodextrin and sorbitol. Whereas we prefer to use dextrose, we have found that all of the aforesaid substances exhibit the property of imparting high gel efficiency to the modified agar preparation.

We have found that best results are obtained if the drying of the aforesaid mixture is carried out quickly by means of a large volume of air heated to a temperature of approximately 200° F. or more. If a lower temperature of air is used, for example 180° F., very large volumes should be employed. In general it is desirable that the moisture content of the mixture should be brought down below 25 percent within thirty minutes time. While we are not prepared to propose a mechanism of action of the crystallization controllers herein disclosed, the term is descriptive in that we have observed that the agents which show appreciable efficacy in the process are all very difficult to crystallize and moreover to some extent exhibit an ability to slow the rate of crystallization of any crystallizable sugars that may be present.

It has hitherto been known that sucrose will promote the cold-water solubility of agar if co-dried from a solution rich in sucrose but very dilute in agar. It is believed that the action of the sugar is to disrupt or free the molecular aggregates of the agar in such a way as to render them hydrophilic. It seems at least possible that the herein employed crystallization controllers, by remaining non-crystalline during a great deal of the drying stage, are for this reason immensely more efficient in maintaining the "uncoiled" structure of dissolved agar; whereas, inert bulking materials or compounds which crystallize out early in the drying stage are inefficient in preventing "re-coiling" of the structure of the molecular aggregates. Therefore, when the latter materials are used exclusively as co-drying agents, the agar must be spread out very thin, i.e., in very dilute solution.

The effect of the crystallization controllers according to the present invention does not appear to be affected by the inclusion of other components. We have found that if the treatment is carried out under the above described conditions the presence of certain further additions of bulking components such as sucrose, lactose, starch, flour or calcium sulphate will not interfere with the cold-water gel strength, and serve a useful purpose in imparting desired handling properties. On the other hand, if it is attempted to replace the dextrose with sucrose or lactose the strength of the standard gel containing 0.4% of treated agar drops from about 300 g. to zero.

Whereas the invention is pointed out with particularity in the subjoined claims, in order to provide a full understanding of the invention and the method of practice thereof, the following examples which have given particularly desirable results are appended. Parts are given in units of weight.

EXAMPLE 1

*Modified Agar*

|  | Parts |
|---|---|
| A. Agar (high gel strength) | 32 |
| Water | 400 |
| B. Sucrose | 50 |
| Anhydrous corn sugar | 100 |
| Calcium sulphate (edible) | 200 |

Mixture A is heated to 212° F. and held for five minutes. B is then added and the whole stirred together thoroughly for five minutes while heat is applied. The entirety is then cast into containers and permitted to cool, whereupon it attains a consistency approximately that of hard rubbery cheese. It is then extruded through a meat grinder or is otherwise subdivided, and dried rapidly with forced hot air to about 3% moisture content. For this purpose a gas-fired single apron drier is preferred. Following drying, the product is pulverized. Whitening agents and extenders may be added if desired. This product is useful where a white background color is desired, as in cake or roll icing.

The modified agar of this example at an agar level of 0.24 percent was 87 percent as effective in gel strength when dissolved in water at 120° F. as was the original agar when dissolved by three minutes of boiling, and at an agar level of 0.36 percent, it was 94 percent as effective.

EXAMPLE 2

*Modified Agar*

|  | Parts |
|---|---|
| A. Agar (high gel strength) | 32 |
| Water | 400 |
| B. Sucrose | 50 |
| Anhydrous corn sugar | 100 |
| Lactose | 200 |

The procedure is the same as that described in Example 1.

EXAMPLE 3

*Flat Icing*

|  | Parts |
|---|---|
| Modified agar produced in accordance with Example 1 | 12.3 |
| Powdered sugar (sucrose) XXXX | 600 |
| Water | 100 |

Dry blend the sugar with the modified agar. Add the water slowly with good agitation. If the water is initially at a temperature of 170° F., the finished icing will not need much heat to reach the proper application temperature of 115° F.

EXAMPLE 4

*Whippable Icing*

|  | Parts |
|---|---|
| Modified agar produced in accordance with Example 1 | 7 |
| Dried egg white | ¾ |
| Powdered sugar (sucrose) XXXX | 600 |
| Water | 105 |

The procedure is the same as that described in Example 1.

EXAMPLE 5

*Gel for Salad or Dessert*

|  | Parts |
|---|---|
| Modified agar produced in accordance with Example 2 | 6 |
| Sugar (sucrose) | 16 |
| Water | 78 |

Color, flavor and citric acid to taste.

Dry blend the modified agar, sugar, color, flavor and citric acid. Add water having a temperature of about 120° F. and permit the preparation to cool and set.

EXAMPLE 6

*Milk Gel or Custard*

|  | Parts |
|---|---|
| Modified agar produced in accordance with Example 1 | 2.5 |
| Guar gum | 0.1 |
| Homogenized milk | 84.4 |
| Flavor to suit | 13.0 |

Warm the milk (to approximately 120° F.) and add the dry ingredients while stirring the mixture. Place in a refrigerator to cool.

EXAMPLE 7

*Cultured Milk Product (Sour Cream, Buttermilk, Yogurt)*

| | Parts |
|---|---|
| Modified agar produced in accordance with Example 1 | 1.5 to 2.0 |
| Guar gum | 1.0 |
| The selected cultured milk product | Balance |

The procedure is the same as that of Example 6.

EXAMPLE 8

*Dental Impression Media*

| | Parts |
|---|---|
| Modified agar produced in accordance with Example 1 | 20 |
| Calcium sulphate | 30 |
| Water (warm) | 50 |

Spatulate the materials together, place in the impression tray, and apply immediately. Remove after two to three minutes' time.

It will be understood that the sucrose, calcium sulphate, lactose, or other bulking agents used in the foregoing examples are not essential. The calcium sulphate and/or lactose serve to facilitate the processing but may be omitted if desired. Additional crystallization controller also may serve as bulking agents. The proportion of bulking agent may be as great as desired, but we find that for most purposes about 75 percent is a suitable upper limit.

What is claimed as our invention is:

1. A process of preparing an improved cold-water soluble agar composition comprising admixing dried agar and water, said agar constituting approximately 5 to 12 percent of the mixture, in the presence of a crystallization controller selected from the class consisting of dextrose, fructose, invert sugar, maltodextrine, and sorbitol, heating the aforesaid components up to the boiling point of water and thereafter drying the product.

2. The process of preparing an improved cold-water soluble agar composition comprising admixing dried agar and water, said agar constituting approximately 5 to 12 percent of the mixture, in the presence of a crystallization controller selected from the class consisting of dextrose, fructose, invert sugar, maltodextrine, and sorbitol, heating the aforesaid components up to the boiling point of water, cooling the mixture until it solidifies, subdividing the solid and rapidly drying it with hot air.

3. A process of preparing an improved cold-water soluble agar composition comprising admixing dried agar and water, said agar constituting approximately 5 to 12 percent of the mixture, in the presence of a crystallization controller selected from the class consisting of dextrose, fructose, invert sugar, maltodextrine, and sorbitol, adding a bulking agent not exceeding 75% of the total weight and selected from the group consisting of cane sugar, lactose, and calcium sulphate, heating the aforesaid components up to the boiling point of water, cooling the mixture until it solidifies, subdividing the solid and rapidly drying it with hot air.

4. A modified agar preparation prepared according to the process of claim 1.

5. An icing stabilizer comprising modified agar produced according to the process of claim 1, together with added bulking agents.

6. An edible gel preparation containing modified agar produced according to the process of claim 1 and added flavoring agents.

7. A cultured milk product containing modified agar produced according to the process of claim 1.

References Cited in the file of this patent

UNITED STATES PATENTS

| | | |
|---|---|---|
| 1,118,369 | Peter | Nov. 24, 1914 |
| 2,702,262 | Bavley et al. | Feb. 15, 1955 |
| 2,949,428 | Leo | Aug. 16, 1960 |
| 2,963,373 | Monti et al. | Dec. 6, 1960 |

OTHER REFERENCES

Skinner: The Science of Dental Materials, 1954, pages 71, 72, W. B. Saunders Co., Philadelphia (available in Div. 56).